United States Patent
Chen et al.

(10) Patent No.: US 7,175,925 B2
(45) Date of Patent: Feb. 13, 2007

(54) PERPENDICULAR MAGNETIC RECORDING MEDIA WITH IMPROVED CRYSTALLOGRAPHIC ORIENTATIONS AND METHOD OF MANUFACTURING SAME

(75) Inventors: Qixu David Chen, Milpitas, CA (US); Thomas P. Nolan, Mountain View, CA (US); Zhong Stella Wu, Fremont, CA (US); Samuel Dacke Harkness, IV, Berkeley, CA (US); Rajiv Yadav Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 95 days.

(21) Appl. No.: 10/663,670

(22) Filed: Sep. 17, 2003

(65) Prior Publication Data

US 2004/0247945 A1 Dec. 9, 2004

Related U.S. Application Data

(60) Provisional application No. 60/475,808, filed on Jun. 3, 2003.

(51) Int. Cl.
G11B 5/66 (2006.01)
G11B 5/70 (2006.01)

(52) U.S. Cl. .................. 428/831; 204/192.2; 427/131
(58) Field of Classification Search ................ 428/828, 428/831
See application file for complete search history.

(56) References Cited

U.S. PATENT DOCUMENTS 6,248,416 B1* 6/2001 Lambeth et al. ......... 428/832.2
6,387,483 B1* 5/2002 Hokkyo et al. ............. 428/332
6,602,621 B2* 8/2003 Matsunuma et al. ... 428/694 TS
6,677,061 B2* 1/2004 Shimizu et al. ........ 428/694 TS
6,699,600 B2* 3/2004 Shimizu et al. ............. 428/692
6,835,475 B2* 12/2004 Carey et al. .......... 428/694 TS
2002/0164501 A1 11/2002 Hikosaka
2004/0038082 A1* 2/2004 Tsumori ............... 428/694 SG

* cited by examiner

Primary Examiner—Holly Rickman
(74) Attorney, Agent, or Firm—McDermott Will & Emery LLP

(57) ABSTRACT

A perpendicular magnetic recording medium, comprising:
(a) a non-magnetic substrate having a surface; and
(b) a layer stack formed over the substrate surface, comprising in overlying sequence from the substrate surface:
  (i) a magnetically soft underlayer;
  (ii) an interlayer structure for crystallographically orienting a layer of a perpendicular magnetic recording material formed thereon; and
  (iii) at least one crystallographically oriented magnetically hard perpendicular recording layer;
wherein the magnetically soft underlayer is sputter-deposited at a sufficiently large target-to-substrate spacing and at a sufficiently low gas pressure selected to provide the underlayer with a smooth surface having a low average surface roughness Ra below about 0.3 nm, as measured by Atomic Force Microscopy (AFM).

23 Claims, 3 Drawing Sheets

PERPENDICULAR MAGNETIC RECORDING MEDIA WITH IMPROVED CRYSTALLOGRAPHIC ORIENTATIONS AND METHOD OF MANUFACTURING SAME

CROSS-REFERENCE TO PROVISIONAL APPLICATION

This application claims priority from U.S. provisional patent application Ser. No. 60/475,808 filed Jun. 3, 2003, the entire disclosure of which is incorporated herein by reference.

FIELD OF THE INVENTION

The present invention relates to high areal recording density perpendicular magnetic recording media with constituent layers having improved crystallographic properties, and to methods for their manufacture. The invention has particular utility in the manufacture and use of data/information storage and retrieval media, e.g., hard disks, having ultra-high areal recording densities.

BACKGROUND OF THE INVENTION

Magnetic media are widely used in various applications, particularly in the computer industry, and efforts are continually made with the aim of increasing the areal recording density, i.e., bit density of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

It is well-known that efficient, high bit density recording utilizing a perpendicular magnetic medium requires interposition of a relatively thick (i.e., as compared to the magnetic recording layer), magnetically "soft" underlayer or "keeper" layer, i.e., a magnetic layer having a relatively low coercivity of about 100 Oe or below, such as of a NiFe alloy (Permalloy), between the non-magnetic substrate, e.g., of glass, aluminum (Al) or an Al-based alloy, and the "hard" magnetic recording layer having relatively high coercivity of several kOe, typically about 3–6 kOe, e.g., of a cobalt-based alloy (e.g., a Co—Cr alloy such as CoCrPtB) having perpendicular anisotropy. The magnetically soft underlayer serves to guide magnetic flux emanating from the head through the hard, perpendicular magnetic recording layer. In addition, the magnetically soft underlayer reduces susceptibility of the medium to thermally-activated magnetization reversal by reducing the demagnetizing fields which lower the energy barrier that maintains the current state of magnetization.

A typical conventional perpendicular recording system 10 utilizing a vertically oriented magnetic recording medium 1 with a relatively thick soft magnetic underlayer, a relatively thin hard magnetic recording layer, and a single-pole head, is illustrated in FIG. 1, wherein reference numerals 2, 2A, 3, 3A, 4, and 5, respectively, indicate a non-magnetic substrate, an adhesion layer (optional), at least one magnetically soft underlayer, an amorphous or crystalline seed layer (optional), at least one non-magnetic interlayer, and at least one perpendicular magnetically hard recording layer. Reference numerals 7 and 8, respectively, indicate the single and auxiliary poles of a single-pole magnetic transducer head 6. The at least one relatively thin interlayer 4 (also referred to as an "intermediate" layer), comprised of one or more non-magnetic materials, serves to (1) prevent magnetic interaction between the soft underlayer 3 and the hard recording layer 5 and (2) promote desired microstructural and magnetic properties of the hard recording layer.

As shown by the arrows in the figure indicating the path of the magnetic flux φ, flux φ emanates from single pole 7 of single-pole magnetic transducer head 6, enters and passes through vertically oriented, hard magnetic recording layer(s) 5 in the region above single pole 7, enters and travels along soft magnetic underlayer(s) 3 for a distance, and then exits therefrom and passes through the perpendicular hard magnetic recording layer 5 in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of each polycrystalline (i.e., granular) hard magnetic layer and interlayer of the layer stack constituting medium 1. As is apparent from the figure, the width of the grains of each of the polycrystalline hard magnetic layer(s) and interlayer(s) constituting the layer stack of the medium (as measured in a horizontal direction in the figure) may be substantially the same, i.e., each overlying layer may replicate the grain width of the underlying layer. A protective overcoat layer 11, such as of a diamond-like carbon (DLC), is formed over hard magnetic layer 5, and a lubricant topcoat layer 12, such as of a perfluoropolyether material, is formed over the protective overcoat layer.

Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials; adhesion layer 2A is typically comprised of an about 2 to about 5 nm thick layer of a material selected from the group consisting of Cr, CrTi, Ti, and TiNb; underlayer(s) 3 is (are) typically comprised of an about 500 to about 4,000 Å thick layer(s) of at least one soft magnetic material selected from the group consisting of NiFe (Permalloy), NiFeNb, CoZr, CoZrCr, CoZrNb, CoFe, Fe, FeN, FeSiAl, FeAlN, FeSiAlN, FeCoC, FeCoB, FeCoTaZr, FeTaN, and FeTaC, or a laminated structure comprised of magnetic layers spaced-apart by thin spacer layers, such as of Ta, C, Si, etc., or a laminated structure comprised of magnetically soft layers spaced apart by anti-ferromagnetic coupling (AFC) layers, e.g., Ru, IrMn, etc.; amorphous or crystalline seed layer(s) 3A are typically comprised of an about 1 to about 5 nm thick layer(s) of at least one material selected from the group consisting of Pd, TiCr, Pt, Cu, Au, Ti, and Ag; interlayer(s) 4 typically comprise(s) an up to about 500 Å thick layer(s) of at least one non-magnetic material, such as Ru, Ti, CoCr, CoCrPt, CoCrTa, CoCrMo, etc.; and hard magnetic layer(s) 5 is (are) typically comprised of an about 50 to about 250 Å thick layer(s) of at least one Co-based magnetic alloy including one or more elements selected from the group consisting of Cr, Fe, Ta, Ni, Mo, Pt, V, Nb, Ge, B, Ti, Zr, Hf, and Pd; and iron nitrides or oxides. The hard magnetic recording layer material has perpendicular anisotropy principally arising from magneto-crystalline anisotropy.

Notwithstanding the improvement (i.e., increase) in areal recording density and SMNR afforded by perpendicular magnetic recording media as described supra, the escalating requirements for increased areal recording density, media stability and SMNR necessitate further improvement in media performance.

As indicated above, perpendicular magnetic recording media typically include at least one magnetically soft underlayer for guiding magnetic flux through the media and to enhance writability, at least one non-magnetic intermediate or interlayer (hereinafter referred to as "interlayer"), and at least one main recording layer. The role of the interlayer(s) is critical for obtaining good media performance. Specifically, in perpendicular magnetic recording media the interlayer(s) serve to provide:

1. control of the crystallographic orientation of the main recording layer(s);
2. control of the grain size and grain distribution of the main recording layer(s);
3. destruction of exchange coupling between magnetically hard recording layers and magnetically soft layers; and
4. physical separation between adjacent grains of the main recording layer(s), which feature is particularly desirable and important when the latter is formed by a low temperature, high gas pressure sputtering process, and/or by a reactive sputtering process, so that an oxide, e.g., Co-oxide, occurs in the boundaries between adjacent grains.

More specifically, the SMNR of perpendicular magnetic recording media is improved by increasing the strength of the preferred c-axis out-of-plane orientation of the perpendicular main recording layer(s) while maintaining a small uniform grain size of the layer(s). The preferred orientation of the magnetic layer(s) depends upon the structural properties of and the interactions between the various previously deposited underlying layers of the media, as well as upon the nature of the substrate.

In general, control of the strength (or amount) of the preferred orientation of thin-film layers is difficult. Formation of a Co-alloy magnetic recording layer with a strong <0002> growth orientation on a structure including a substrate, a soft magnetic underlayer, and non-magnetic seed and interlayers between about 0.2 and 40 nm thick is extremely difficult.

Differences in crystallographic orientation between adjacent thin film layers are affected by the surface and interfacial energies of the materials of the layers, and by heteroepitaxial (or coherent) growth of one layer upon another layer of a chemically incompatible material with related crystal lattice structure and atomic interplanar spacings.

The soft magnetic underlayer of perpendicular magnetic recording media generally is composed of a small grain or amorphous material containing at least one of Fe and Co. According to prior practice, a non-magnetic material of hcp structure, e.g., Ru, may be deposited on the soft magnetic underlayer, which non-magnetic hcp material grows with a moderately strong <0002> preferred orientation and small grain size. A magnetic material of hcp structure, typically a Co-based alloy, may grow coherently on the hcp non-magnetic layer, also with <0002> growth orientation and small grain size. The quality of the <0002> growth orientation can be determined from the size of symmetric X-ray diffraction ("XRD") peaks and rocking curves. Strong preferred growth orientation of the Co-based alloy with the hcp <0002> axis out-of-plane is generally necessary for achieving good performance of high areal recording density perpendicular magnetic media. Unfortunately, however, the quality of growth orientation of an hcp material upon the soft magnetic underlayer depends upon the selected material, and prior intermediate or underlayer structures, such as with a Ru layer and a Co-alloy layer, generally have not afforded the desired strength of <0002> growth orientation.

As indicated supra, one type of perpendicular magnetic recording media comprises Co alloy-based recording layers wherein oxides are present between adjacent magnetic grains for enhancing inter-granular separation. Such layers are typically formed by a sputtering process performed at a high pressure, e.g., about 30 mTorr, with Ru alloy-based films utilized as interlayers beneath the recording layer(s). When the Ru alloy-based interlayers are deposited, as by sputtering at a relatively high gas pressure, the physical separation between neighboring grains afforded by the oxides and/or voids promotes de-coupling of the magnetic grains and enhances the coercivity of the layer. However, the crystallographic (0002) orientations of the Ru/Co-alloy interlayer/magnetic alloy bi-layer structure are not as good as when the Ru interlayer is sputter-deposited at a lower pressure.

The above-described behavior may be demonstrated by reference to FIG. 2, which presents, in graphical form, the variation of the full-width at half-maximum (FWHM) of XRD (X-ray diffraction) rocking curves and coercivity ($H_c$) of perpendicular magnetic media of the following structure: 200 nm FeCoB soft magnetic underlayer/30 nm Ru interlayer/9 mm $CoCrPtO_x$ perpendicular recording layer/4.2 nm C protective overcoat layer, as a function of the gas pressure during sputter deposition of the Ru interlayer.

As is evident from FIG. 2, media for which the Ru interlayer is deposited at a lower gas pressure (i.e., ~0.8 mTorr) during sputter deposition have narrower FWHM of the Ru/Co (0002) peaks of the XRD rocking curves than media for which the Ru interlayer is deposited at a higher sputter gas pressure (~7 to ~30 mTorr). However, the coercivity ($H_c$) of the media is significantly higher when the Ru interlayer is deposited at the higher sputter gas pressures, which high coercivities are much desired. From a consideration of these apparent competing factors or tendencies, it is apparent that the problem/drawback of poor crystallographic orientations of media (i.e., with wide FWHM) wherein the Ru interlayer is deposited at the higher sputter gas pressures requires resolution.

In view of the above-demonstrated critical nature of the intermediate or interlayer in obtaining high performance perpendicular magnetic recording media, there exists a clear need for improved film or layer structures for facilitating highly oriented crystal growth thereon, and for highly crystallographically oriented perpendicular magnetic recording media comprising improved intermediate or interlayer structures for providing enhanced performance characteristics.

The present invention, therefore, addresses and solves problems attendant upon the design and manufacture of improved film or layer structures for facilitating highly oriented crystal growth and fabrication of high performance, ultra-high areal recording density perpendicular magnetic recording media, while maintaining full compatibility with the economic requirements of cost-effective, large-scale, automated manufacturing technology.

DISCLOSURE OF THE INVENTION

An advantage of the present invention is improved perpendicular magnetic recording media.

Another advantage of the present invention is a method of manufacturing improved perpendicular magnetic recording media.

These and additional advantages and other features of the present invention will be set forth in the description which follows and in part will become apparent to those having ordinary skill in the art upon examination of the following or may be learned from the practice of the invention. The advantages of the present invention may be realized as particularly pointed out in the appended claims.

According to an aspect of the present invention, the foregoing and other advantages are obtained in part by a perpendicular magnetic recording medium, comprising:

(a) a non-magnetic substrate having a surface; and (b) a layer stack formed over the substrate surface, the layer stack comprising, in overlying sequence from the substrate surface:

(i) a magnetically soft underlayer;

(ii) an interlayer structure for crystallographically orienting a layer of a perpendicular magnetic recording material formed thereon; and (iii) at least one crystallographically oriented magnetically hard perpendicular recording layer;

wherein the magnetically soft underlayer is sputter-deposited at a sufficiently large target-to-substrate spacing and a sufficiently low gas pressure selected to provide the underlayer with a smooth surface having a low average surface roughness Ra below about 0.3 nm, as measured by Atomic Force Microscopy.

According to embodiments of the present invention, the magnetically soft underlayer comprises at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, FeCoTaZr, and a laminated structure comprised of a plurality of magnetic layers each comprised of at least one of the recited magnetic materials and spaced-apart by thin spacer layers each comprised of at least one material selected from the group consisting of Ta, C, and Si or thin anti-ferromagnetic coupling (AFC) layers, each comprised of at least one material selected from the group consisting of Ru and IrMn.

Preferred embodiments of the present invention include those wherein the magnetically soft underlayer comprises FeCoB; and the interlayer structure comprises, in overlying sequence from a surface of the magnetically soft underlayer:

(1) a first crystalline interlayer of a non-magnetic material formed in a gas atmosphere at a first pressure; and (2) a second crystalline interlayer of a non-magnetic material formed in a gas atmosphere at a second pressure greater than the first pressure provides the magnetically hard perpendicular magnetic recording layer formed thereon with a hexagonal close-packed crystal lattice with a strong <0002> out-of-plane growth orientation, each of the first and said second crystalline interlayers comprising a non-magnetic material selected from the group consisting of Ru, RuCr, other Ru-based alloys, CoCrRu, Ti, CoCr, CoCrPt, CoCrTa, and CoCrMo, and adjacent grains of the second crystalline interlayer are physically separated.

In accordance with further preferred embodiments of the invention, adjacent grains of the at least one magnetically hard perpendicular recording layer are physically separated and the at least one magnetically hard perpendicular recording layer has a hexagonal close-packed crystal lattice with a strong <0002> out-of-plane growth orientation; the at least one magnetically hard perpendicular recording layer comprising at least one magnetic material selected from the group consisting of: (1) Co-based magnetic alloys including one or more elements selected from the group consisting of Cr, Fe, Ta, Ni, Mo, Pt, V, Nb, Ge, Si, Al, B, Ti, Zr, Hf, and Pd; (2) oxides of the Co-based magnetic alloys; (3) iron nitrides; and (4) iron oxides.

Further embodiments of media according to the invention include those wherein the layer stack further comprises:

(iv) an amorphous or crystalline seed layer between the magnetically soft underlayer and the first crystalline interlayer, comprising at least one material selected from the group consisting of: Ta, Au, Cu, Pd, TiCr, Pt, and Ag;

(v) an adhesion layer in overlying contact with the substrate surface, comprising at least one material selected from the group consisting of: Cr, CrTi, Ti, and TiNb; and (vi) a protective overcoat layer on an outermost surface of the at least one magnetically hard perpendicular recording layer, comprising a carbon (C)-containing material.

Another aspect of the present invention is a perpendicular magnetic recording medium, comprising:

(a) a non-magnetic substrate having a surface; and (b) a layer stack formed over the substrate surface, the layer stack comprising, in overlying sequence from the substrate surface:

(i) a magnetically soft underlayer;

(ii) an amorphous or crystalline seed layer;

(iii) an interlayer structure for crystallographically orienting a layer of a perpendicular magnetic recording material formed thereon; and (iv) at least one crystallographically oriented magnetically hard perpendicular recording layer;

wherein:

the magnetically soft underlayer is sputter-deposited at a sufficiently large target-substrate spacing and a sufficiently low gas pressure selected to provide the underlayer with a smooth surface having a low average surface roughness Ra below about 0.3 nm, as measured by Atomic Force Microscopy (AFM); and the interlayer structure provides the at least one magnetically hard perpendicular magnetic recording layer formed thereon with a hexagonal close-packed crystal lattice with a strong <0002> out-of-plane growth orientation and comprises, in overlying sequence from a surface of the amorphous or crystalline seed layer:

(1) a first crystalline interlayer of a non-magnetic material formed in a gas atmosphere at a first pressure; and (2) a second crystalline interlayer of a non-magnetic material formed in a gas atmosphere at a second pressure greater than the first pressure.

According to preferred embodiments of the present invention, adjacent grains of the second crystalline interlayer and the at least one magnetically hard perpendicular magnetic recording layer are physically separated; and the magnetically soft underlayer comprises at least one magnetic material selected from the group consisting of: NiFe (Permalloy), NiFeNb, CoZr, CoZrCr, CoZrNb, CoFe, Fe, FeN, FeSiAl, FeAlN, FeSiAlN, FeCoC, FeCoB, FeTaN, FeTaC, and FeCoTaZr, and a laminated structure comprised of a plurality of magnetic layers each comprised of at least one of the recited magnetic materials and spaced-apart by thin spacer layers each comprised of at least one material selected from the group consisting of Ta, C, and Si or thin anti-ferromagnetic coupling (AFC) layers each comprised of at least one material selected from the group consisting of: Ru and IrMn; the amorphous or crystalline seed layer comprises at least one material selected from the group consisting of: Ta, Au, Cu, Pd, TiCr, Pt, and Ag; each of the first and second crystalline interlayers comprises a non-magnetic material selected from the group consisting of Ru, RuCr, other Ru-based alloys, CoCrRu, Ti, CoCr, CoCrPt, CoCrTa, and CoCrMo; and the at least one magnetically hard perpendicular recording layer comprises at least one magnetic material selected from the group consisting of: (1) Co-based magnetic alloys including one or more elements selected from the group consisting of Cr, Fe, Ta, Ni, Mo, Pt, V, Nb, Ge, Si, Al, B, Ti, Zr, Hf, and Pd; (2) oxides of the Co-based magnetic alloys; (3) iron nitrides; and (4) iron oxides.

Further preferred embodiments of the present invention include media wherein the layer stack further comprises:

(v) an adhesion layer in overlying contact with the substrate surface; and (vi) a protective overcoat layer on an outermost surface of the at least one magnetically hard perpendicular recording layer.

Yet another aspect of the present invention is a method of manufacturing a perpendicular magnetic recording medium, comprising steps of:

(a) providing a non-magnetic substrate having a surface; and (b) forming a layer stack over the substrate surface, the layer stack comprising, in overlying sequence from the substrate surface:

(i) a magnetically soft underlayer;

(ii) an amorphous or crystalline seed layer;

(iii) an interlayer structure for crystallographically orienting a layer of a perpendicular magnetic recording material formed thereon; and (iv) at least one crystallographically oriented magnetically hard perpendicular recording layer;

wherein the magnetically soft underlayer is formed by sputter deposition at a sufficiently large target-substrate spacing and a sufficiently low gas pressure selected to provide the underlayer with a smooth surface having a low average surface roughness Ra below about 0.3 nm, as measured by Atomic Force Microscopy (AFM); and the interlayer structure provides the at least one magnetically hard perpendicular magnetic recording layer formed thereon with a hexagonal close-packed crystal lattice with a strong <0002> out-of-plane growth orientation and comprises sputter forming, in overlying sequence from a surface of the amorphous or nano-crystalline seed layer:

(1) a first crystalline interlayer of a non-magnetic material sputter-deposited in a gas atmosphere at a first pressure; and (2) a second crystalline interlayer of a non-magnetic material sputter-deposited in a gas atmosphere at a second pressure greater than the first pressure.

According to preferred embodiments of the present invention, step (b) comprises forming the second crystalline interlayer and the at least one magnetically hard perpendicular magnetic recording layer such that adjacent grains thereof are physically separated; and the magnetically soft underlayer comprises at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, and FeCoTaZr, and a laminated structure comprised of a plurality of magnetic layers each comprised of at least one of the recited magnetic materials and spaced-apart by thin spacer layers each comprised of at least one material selected from the group consisting of Ta, C, and Si or thin anti-ferromagnetic coupling (AFC) layers each comprised of at least one material selected from the group consisting of: Ru and IrMn; the amorphous or crystalline seed layer comprises at least one material selected from the group consisting of: Ta, Au, Cu, Pd, TiCr, Pt, and Ag; each of the first and said second crystalline interlayers comprises a non-magnetic material selected from the group consisting of: Ru, RuCr, other Ru-based alloys, CoCrRu, Ti, CoCr, CoCrPt, CoCrTa, and CoCrMo; and the at least one magnetically hard perpendicular recording layer comprises at least one magnetic material selected from the group consisting of: (1) Co-based magnetic alloys including one or more elements selected from the group consisting of Cr, Fe, Ta, Ni, Mo, Pt, V, Nb, Ge, Si, Al, B, Ti, Zr, Hf, and Pd; (2) oxides of the Co-based magnetic alloys; (3) iron nitrides; and (4) iron oxides.

In accordance with further preferred embodiments of the invention, step (b) further comprises forming as part of the layer stack:

(v) an adhesion layer in overlying contact with the substrate surface; and (vi) a protective overcoat layer on an outermost surface of the at least one magnetically hard perpendicular recording layer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

The present invention is based upon recognition by the inventors that very high areal recording density perpendicular magnetic recording media with improved crystallographic orientations performance characteristics, which media typically utilize magnetic alloys as the material of the perpendicular recording layer(s), e.g., hcp Co-based alloys requiring strong <0002> preferred growth orientation, can be reliably and controllably fabricated, for example, by conventional sputtering techniques, with optimum crystallographic properties (e.g., growth orientation) and physical separation of the grains of the component crystalline layers, particularly the interlayer(s) and perpendicular recording layer(s), by means of appropriate layer design, deposition conditions, and materials selection.

Perpendicular recording media fabricated according to the present invention include one or more of the following features:

1. a very smooth-surfaced first interlayer of a dual-layer interlayer structures, i.e., an interlayer structure comprised of a first crystalline interlayer of a non-magnetic material formed by sputter deposition in a gas atmosphere at a first pressure (e.g., not greater than about 3 mTorr) and a second crystalline interlayer of a non-magnetic material formed by sputter deposition in a gas atmosphere at a second pressure greater than the first pressure (e.g., not less than about 15 mTorr), which interlayer structure promotes and strengthens a desired out-of-plane crystallographic growth orientation of a perpendicular magnetic recording layer deposited thereon;

2. (a) very smooth-surfaced, amorphous or crystalline seed or wetting layer(s) beneath the interlayer structure, which smooth-surfaced seed layer(s) significantly improve (s) magnetic and crystallographic properties of the media;

3. (a) very smooth-surfaced, magnetically soft underlayer (s), formed by sputtering at increased target-substrate distances (e.g., not less than about 2 in.) and at low gas pressures (relative to conventional sputtering practices), which smooth-surfaced magnetically soft underlayer(s) control(s) the out-of-plane crystallographic orientation of, e.g., hcp-structured interlayers and magnetic recording layers; and 4. crystalline interlayers and perpendicular magnetic recording layers formed with physically well-separated crystal grains.

Figure 1:
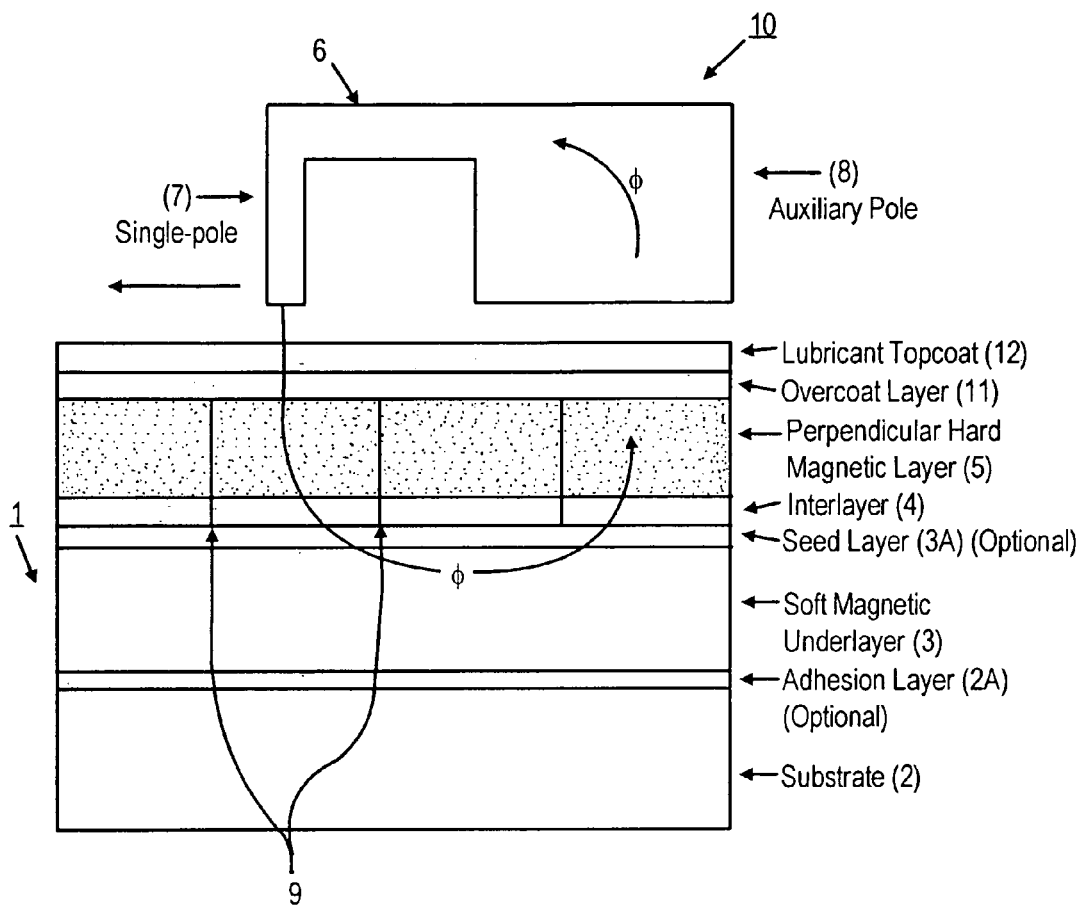
FIG. 1 schematically illustrates, in simplified cross-sectional view, a portion of a magnetic recording, storage, and retrieval system comprised of a single-pole transducer head and a conventional perpendicular type magnetic recording medium.
Figure 2:
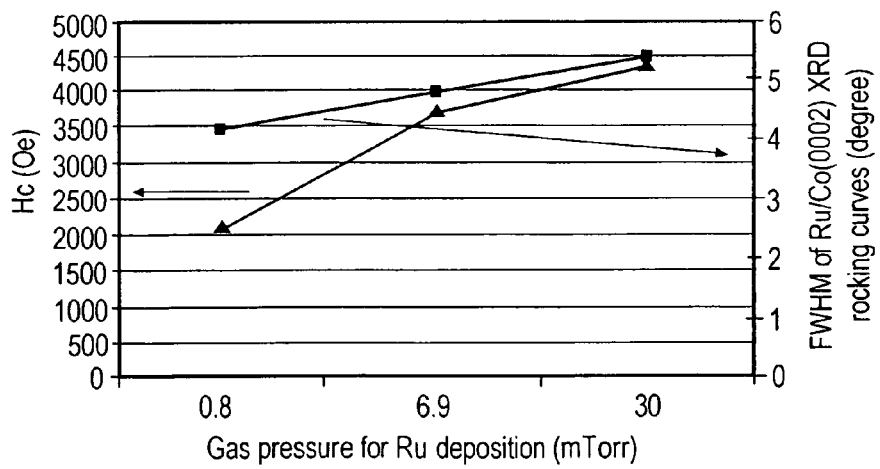
FIG. 2 is a graph for illustrating the variation of the FWHM of XRD rocking curves of Ru/Co (0002) peaks and coercivity ($H_c$) of FeCoB/Ru/CoCrPtO$_x$ perpendicular magnetic recording media as a function of the gas pressure during the Ru interlayer deposition.
Figure 3:
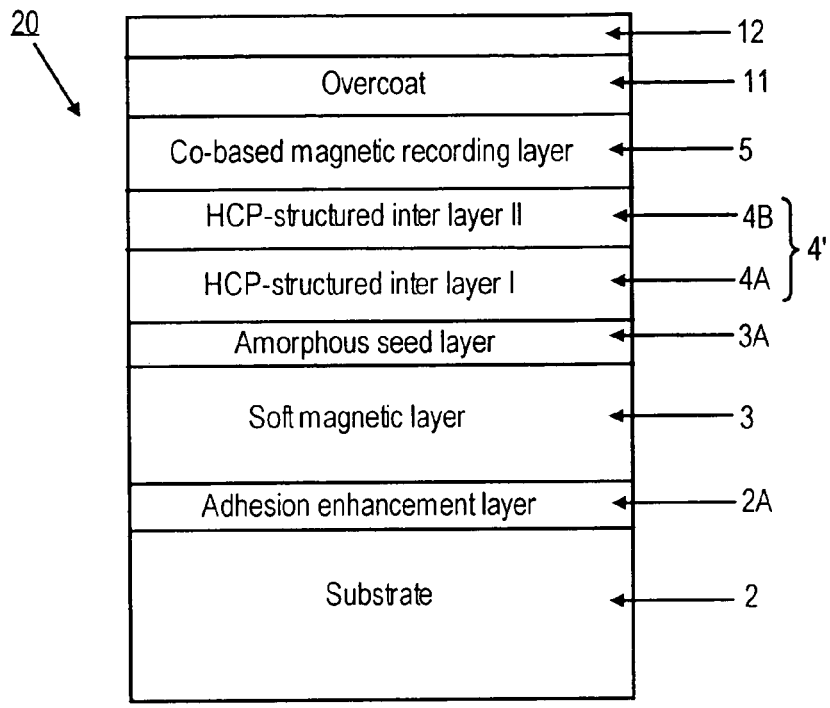
FIG. 3 schematically illustrates, in simplified cross-sectional view, a portion of a perpendicular type magnetic recording medium according to an embodiment of the present invention.

Referring now to FIG. 3, schematically illustrated therein, in simplified cross-sectional view, is a portion of a preferred embodiment of a perpendicular magnetic recording medium 20 fabricated according to the principles of the present invention. More specifically, perpendicular magnetic recording medium resembles the conventional perpendicular magnetic recording medium 1 of FIG. 1, and comprises a series of thin-film layers arranged in an overlying (stacked) sequence on a suitable non-magnetic substrate 2, and includes a soft magnetic underlayer 3, an amorphous or crystalline seed layer (3A), a dual-layer, non-magnetic interlayer structure 4' according to the present invention, a perpendicularly oriented, magnetically hard (main) recording layer 5, a protective overcoat layer 11, typically comprised of a carbon (C)-containing material, such as diamond-like carbon (DLC), and a lubricant topcoat layer 12, typically comprised of a perfluoropolyether compound.

In accordance with embodiments of the present invention, e.g., as with hard disks, the non-magnetic substrate 2 is sufficiently thick as to provide medium 20 with a desired rigidity and comprises a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof. Substrate 2 may further comprise, in overlying sequence from the surface thereof, a plating layer 2A and an adhesion layer 2B. A suitable material for plating layer 2A, as when substrate 2 is comprised of Al or an Al alloy, such as Al—Mg, is amorphous NiP, and suitable materials for adhesion layer 2B include Cr, CrTi, Ti, and TiNb.

Overlying substrate 2 is a magnetically soft underlayer 3, from about 50 to about 400 nm thick, preferably from about 80 to about 200 nm thick, typically comprised of at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, and FeCoTaZr, and a laminated structure comprised of a plurality of magnetic layers each comprised of at least one of the recited magnetic materials and spaced-apart by thin thin spacer layers each comprised of at least one material selected from the group consisting of Ta, C, and Si or thin anti-ferromagnetic coupling (AFC) layers, each comprised of at least one material selected from the group consisting of Ru and IrMn.

In accordance with certain preferred embodiments of the invention, an amorphous or crystalline seed or wetting layer 3A from about 1 to about 5 nm thick, preferably about 1–2 nm thick, and comprised of at least one material selected from the group consisting of: Ta, Au, Cu, Pd, Pt, TiCr, and Ag, overlies soft magnetic underlayer 3, wherein the combination of the soft magnetic underlayer 3 and the amorphous or crystalline seed layer 3A provides a smoother surface for subsequent layer deposition thereon than is possible with the soft magnetic underlayer alone.

According to preferred embodiments of the present invention, a non-magnetic interlayer structure 4' is interposed between the magnetically soft underlayer 3 (or an overlying amorphous or nano-crystalline seed layer 3A as described supra) and the magnetically hard (main) perpendicular recording layer 5, which non-magnetic interlayer structure 4' is described in detail below.

Magnetically hard perpendicular recording layer 5 overlying the non-magnetic interlayer structure 4' is from about 5 to about 25 nm thick, preferably from about 7 to about 11 nm thick, and includes at least one layer comprised of at least one magnetic material selected from the group consisting of: Co-based magnetic alloys including one or more elements selected from the group consisting of: (1) Cr, Fe, Ta, Ni, Mo, Pt, V, Nb, Ge, Si, Al, B, Ti, Zr, Hf, and Pd; (2) oxides of the Co-based magnetic alloys (3) iron nitrides; and (4) iron oxides. Preferably, perpendicular recording layer 5 includes at least one layer of an hcp ferromagnetic alloy material with strong <0002> preferred growth orientation, preferably comprised of Co containing at least one element selected from the group consisting of Pt, Cr, Ta, B, Cu, W, Mo, and Nb.

Completing the layer stack of medium 20 are protective overcoat layer 11 atop recording layer 5, typically a layer of a carbon-containing material <100 Å thick, and a lubricant topcoat layer 12 atop the protective overcoat layer 11, typically a layer of a perfluoropolyether <50 Å thick.

According to the invention, interlayer structure 4' is a bi-layer structure having an overall (i.e., combined) thickness of from about 4 to about 50 nm, preferably about 10–20 nm, which bi-layer structure, inter alia, crystallographically orients out-of-plane growth of the at least one overlying perpendicular magnetic recording layer 5 along a preferred growth direction. In accordance with preferred embodiments of the invention, bi-layer structure 4' is utilized together with the aforementioned hcp Co-containing magnetic alloys with <0002> preferred out-of-plane growth orientation, and comprises, in overlying sequence from the amorphous or nano-crystalline seed layer 3A:

(a) a first crystalline interlayer 4A of a non-magnetic material from about 2 to about 40 (nm thick and formed, e.g., by sputtering, in a gas atmosphere at a first pressure less than about 5 mTorr; and (b) a second crystalline interlayer 4B of a non-magnetic material from about 2 to about 25 nm thick and formed, e.g., by sputtering, in a gas atmosphere at a second pressure greater than the first pressure, i.e., at least about 15 mTorr, illustratively ~30 mTorr.

It should be recognized, however, that the first and second interlayers 4A and 4B, respectively, can be formed (i.e., sputter-deposited) under a continuously increasing gas pressure, commencing with the first (i.e., initial), lower pressure and terminating with the second (i.e., final), higher pressure, which second pressure is preferably at least 10 times greater than the first pressure. When fabricated in this manner, no sharp transition or interface is formed between the first and second interlayers.

Interlayers 4A and 4B may also be formed (i.e., sputter-deposited) such that a distinct transition layer is present between the first and second interlayers, which transition layer is formed at a transitional gas pressure.

Preferably, each of the crystalline interlayers 4A and 4B is comprised of a non-magnetic material selected from the group consisting of Ru, RuCr, other Ru-based alloys, CoCrRu, Ti, CoCr, CoCrPt, CoCrTa, and CoCrMo and adjacent grains of the second crystalline interlayer 4B and the overlying at least one crystalline perpendicular magnetic recording layer 5 are physically well-separated, as by the presence of oxide(s) and/or voids at the grain boundaries.

Each of the constituent thin film layers 2A, 2B, 3, 3A, 4A, 4B, 5, and 11 of the layer stack of medium 20 is preferably formed by sputtering, and lubricant topcoat 12 may be formed in conventional fashion, e.g., by dipping, spraying, or vapor deposition.

Figure 4:
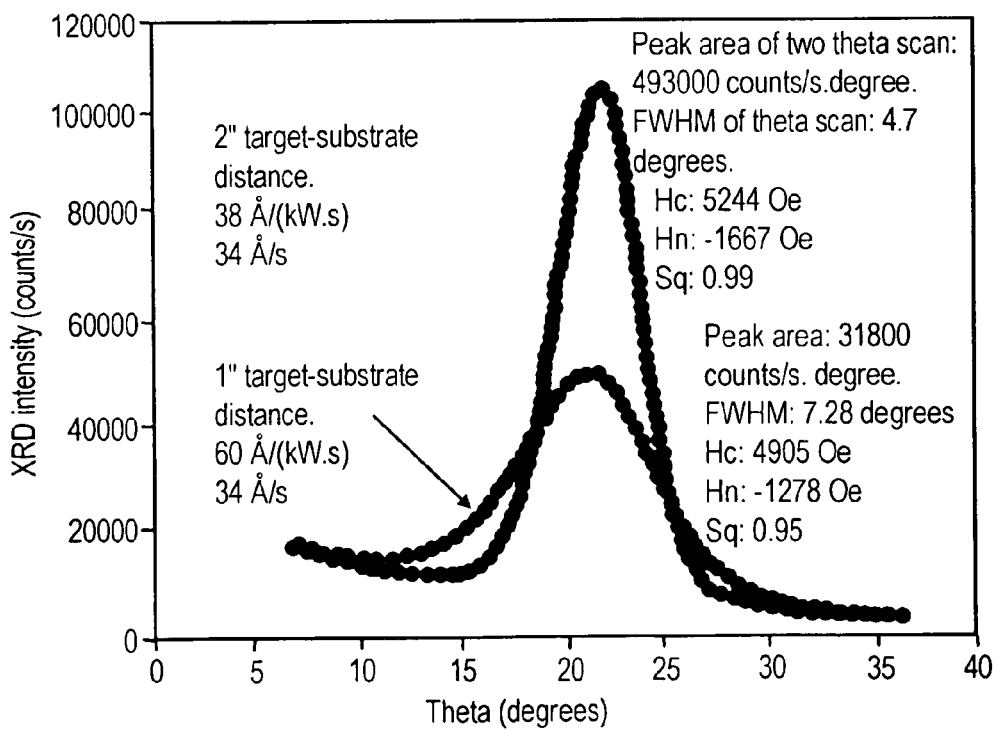
FIG. 4 is a graph for illustrating the variation of XRD rocking curves of Ru/Co (0002) peaks of FeCoB/Ru/CoCr$_{37}$Pt$_6$/CoCr$_{22}$Pt$_{19}$B$_1$/CoCr$_{20}$Pt$_{15}$/C perpendicular magnetic recording media as a function of substrate—target spacing during sputter deposition of the FeCoB magnetically soft underlayer.

The principles of the present invention will now be illustrated by reference to the following:

Adverting to FIG. 4, shown therein is a graph for illustrating the variation of XRD rocking curves of Ru/Co (0002) peaks of perpendicular magnetic recording media with a structure of: FeCoB (170 nm)/Ru (2.5 nm)/CoCr$_{37}$Pt$_6$ (7.5 nm)/CoCr$_{22}$Pt$_{19}$B$_1$ (6.7 nm)/CoCr$_{20}$Pt$_{15}$ (11.7 nm)/C (3.5 nm), as a function of substrate—target spacing during sputter deposition of the FeCoB magnetically soft underlayer. As is evident from FIG. 4, an increase in the substrate-target distance (or spacing) during sputter deposition of the magnetically soft underlayer 3 significantly improves the crystallographic orientation of hcp-structured interlayers 4 and magnetically hard recording layers 5, as well as the magnetic performance characteristics of the media, such as coercivity ($H_c$), nucleation field ($H_n$), and squareness ($S_q$). In obtaining the data for graph of FIG. 4, media were formed by sputter depositing under identical conditions, but for the target-substrate distance (or spacing) during deposition of the FeCoB magnetically soft underlayer 3, and the deposition rate of the FeCoB layer (in Å/sec.) was the same. Atomic Force Microscopy ("AFM") indicated that the average surface roughness ($R_a$) of media structures comprised of FeCoB (160 nm)/Ru (3 nm)/C (3.5 mm) wherein the FeCoB magnetically soft underlayer is sputter-deposited in an atmosphere of 2.9 mTorr and target-substrate spacings of 2" and 1" is respectively 0.288 and 0.317 nm.

While not desirous of being bound by any particular theory for explaining the above-described behavior of media fabricated with different target-substrate spacings during sputter deposition of the FeCoB magnetically soft underlayer, it is nonetheless believed that oblique incidence of the depositing atoms and particles is reduced at the larger target-substrate spacings, thereby reducing surface roughness of the FeCoB layer, as well as the roughness of the subsequently deposited constituent layers of the medium. It is further believed that the enhanced surface smoothness of the constituent layers of the media afforded by the inventive methodology (i.e., wherein the FeCoB magnetically soft underlayer is sputter-deposited at increased target-substrate spacings) is a significant contributing factor to the narrower FWHM, higher $H_c$, increased negativity $H_n$, and $S_q$ of the media.

Figure 5:
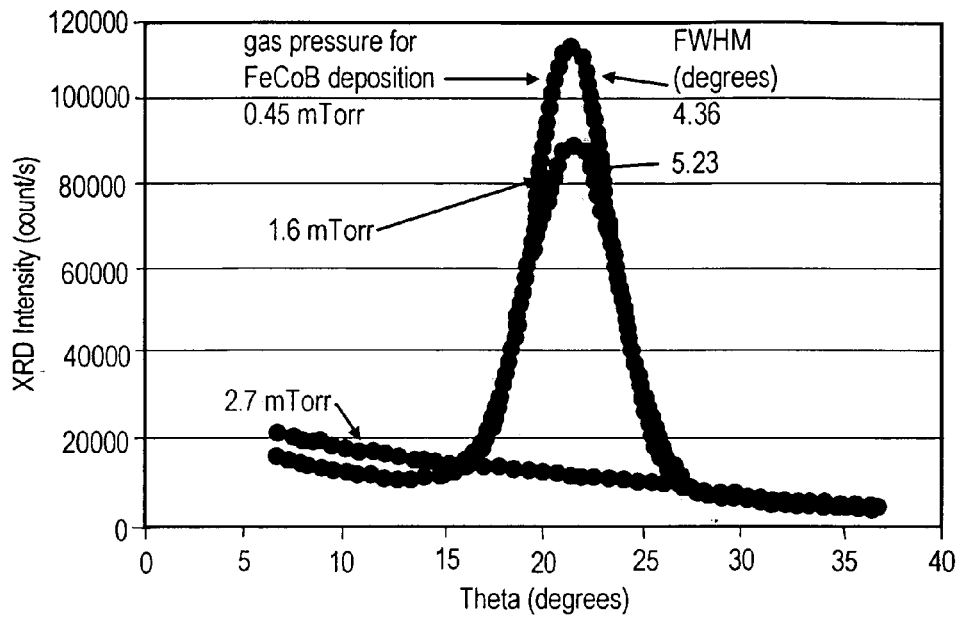
FIG. 5 is a graph for illustrating the variation of XRD rocking curves of Ru/Co (0002) peaks of FeCoB/Ru/CoCr$_{37}$Pt$_6$/CoCr$_{22}$Pt$_{19}$B$_1$/CoCr$_{20}$Pt$_{15}$/C perpendicular magnetic recording media as a function of gas pressure during sputter deposition of the FeCoB magnetically soft underlayer.

It has also been found that the gas pressure during deposition (e.g., sputter deposition) of the magnetically soft underlayer 3 plays a significant role in controlling the crystallographic orientation of the hcp-structured interlayers 4 and magnetically hard recording layers 5. Generally, relatively thick magnetically soft underlayers are utilized in perpendicular recording media applications, which thick films typically are rough-surfaced. Referring to FIG. 5, shown therein is a graph for illustrating the variation of XRD rocking curves of Ru/Co (0002) peaks of perpendicular magnetic recording media of the following structure: FeCoB (160 nm)/Ru (2.5 nm)/CoCr$_{37}$Pt$_6$ 7.5 nm)/CoCr$_{22}$Pt$_{19}$B$_1$ (6.7 nm)/CoCr$_{20}$Pt$_{15}$ (11.7 nm)/C (3.5 nm), as a function of gas pressure during sputter deposition of the FeCoB magnetically soft underlayer. As is evident from the figure, media wherein the FeCoB magnetically soft underlayer is sputter deposited under lower gas pressure atmospheres have narrower FWHM Ru/Co (0002) peaks, which phenomenon is attributed to the smoother-surfaced films obtained when deposition processing occurs at the lower gas pressures.

Physical separation of the magnetic grains of the recording layer 5 also plays a significant role in the performance of perpendicular media with oxide-containing magnetically hard recording layers. Separation of the grains of the second interlayer 4B immediately underlying the recording layer 5 enhances physical separation of the grains of the latter. It has been determined that for media with a first hcp-structured interlayer 4A sputter-deposited in a lower gas pressure atmosphere and a second hcp-structured interlayer 4B sputter-deposited in a higher gas pressure atmosphere have magnetic recording layers 5 with good separation of adjacent grains and good crystallographic orientations. For example, Table I below provides a comparison of the magnetic properties and FWHM of Ru/Co (0002) peaks of XRD rocking curves of media with CoCrRu/Ru bi-layer interlayer structures and single Ru interlayers. The media were fabricated by sputter deposition utilizing a Circulus M 14 sputter system and had the following structure: FeCoB (170 nm)//CoCr$_{37}$Ru$_{10}$/Ru//CoPtO$_x$ (12.4 nm)//C (4.6 nm). The gas pressure was 1.1 mTorr during sputter deposition of the CoCrRu layer and 30 mTorr during sputter deposition of the Ru layer. As is clear from Table I, media wherein the interlayer comprised a bi-layer structure and the first (CoCrRu) interlayer was deposited at the lower gas pressure exhibited much higher values of $H_c$, $-H_n$, $S_q$, and much narrower FWHM.

TABLE I

| CoCrRu thickness (nm) | Ru thickness (nm) | Total interlayer thickness (nm) | $H_c$ (Oe) | $-H_n$ (Oe) | $S_q$ (Oe) | FWHM (degrees) |
|---|---|---|---|---|---|---|
| 3 | 30 | 33 | 6274 | 4001 | 0.999 | 3.98 |
| 0 | 33 | 33 | 5912 | 410 | 0.876 | 6.7 |

The effect of interlayer structure and deposition conditions therefor on average surface roughness (Ra), FWHM of the peaks of RuCr (0002) XRD rocking curves, and physical separation of adjacent grains is further illustrated by reference to Table II below. In this instance, the FWHM of the peaks of RuCr (0002) XRD rocking curves of film stacks of structure: Ti (3 nm)//FeCoB (105 nm)//Ag (1.5 nm)//RuCr (9 nm)//C (3 nm) were measured and the Ra determined by means of Atomic Force Microscopy (AFM). The RuCr interlayer films were deposited under 3 types of process conditions, as indicated in Table II.

TABLE II

| RuCr structure | $(RuCr)_1$ gas pressure, mTorr | $(RuCr)_2$ or RuCr gas pressure, mTorr | $(RuCr)_1/(RuCr)_2$ thickness ratio | Ra, nm | FWHM, degrees |
|---|---|---|---|---|---|
| RuCr | — | 3 | — | 0.455 | 3.37 |
| RuCr | — | 40 | — | 0.491 | 3.71 |
| $(RuCr)_1/(RuCr)_2$ | 3 | 40 | 1 | 0.458 | 3.52 |

As is evident from the results summarized in Table II, film stacks with interlayer $(RuCr)_1/(RuCr)_2$ bi-layer structures made according to the present invention, i.e., where the first RuCr interlayer $(RuCr)_1$ is deposited under a lower gas pressure than the second RuCr interlayer $(RuCr)_2$, have smoother surfaces (i.e., lower Ra) and narrower FWHM than film stacks where a single RuCr interlayer is deposited under a high (40 mTorr) gas pressure. In addition, the film stacks with interlayer $(RuCr)_1/(RuCr)_2$ bi-layer structures made according to the present invention feature well-separated grains at the top portions of the interlayer structures. By contrast, film stacks with single RuCr interlayers deposited under a low gas pressure (3 mTorr) exhibited smooth surfaces and narrow FWHM but the grains at the top portion of the interlayers were not well-separated. Film stacks with single RuCr interlayers deposited under a high gas pressure (40 mTorr) exhibited well-separated grains at the top surfaces thereof, but their surfaces were not smooth and the FWHM was not narrow.

Figure 6:
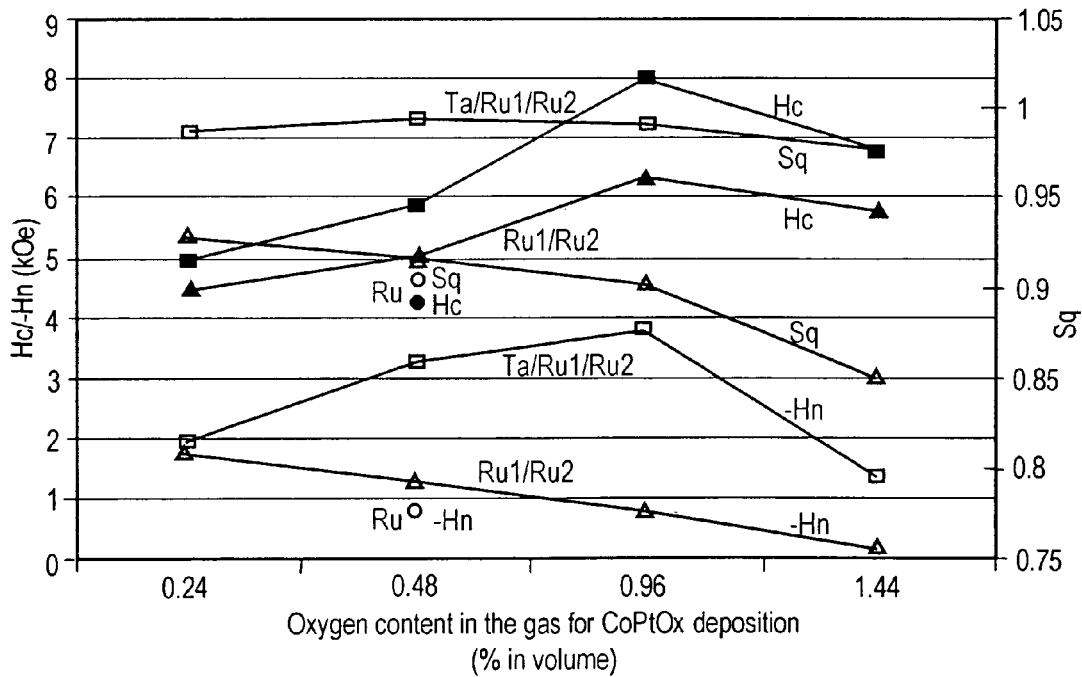
FIG. 6 is a graph for illustrating the variation of coercivity ($H_c$), nucleation field ($H_n$), and squareness ($S_q = M_r/M_s$) of CoZrNb/seed+interlayers/CoPtO$_x$/C perpendicular magnetic recording media as a function of % oxygen gas during deposition of the $CoPtO_x$ perpendicular magnetic recording layer.

Certain materials exhibit a wetting effect, and therefore can be utilized as seed layers 3A between the magnetically soft underlayer 3 and the interlayer structure 4'. It has been found that thin Ta films can be deposited in amorphous form as seed layers which significantly enhance the crystallographic orientations of hcp-structured interlayers and magnetic recording layers, and improve the magnetic performance properties of the resultant media. Referring now to FIG. 6, shown therein is a graph for illustrating the variation of coercivity ($H_c$), nucleation field ($H_n$), and squareness ($S_q$) of perpendicular magnetic recording media of structure: CoZrNb/seed+interlayers/CoPtO$_x$/C, as a function of % oxygen gas during deposition of the CoPtOX perpendicular magnetic recording layer. Three different seed/interlayer structures (with similar overall thicknesses) were utilized, i.e., Ta/Ru$_1$/Ru$_2$; Ru$_1$/Ru$_2$; and a single seed/interlayer of Ru. The gas pressure during sputter deposition and thicknesses of each of the three seed/interlayer structures are given in Table III below. As the data in Table III demonstrate, media wherein the Ta seed layer and the first Ru interlayer, i.e., Ru$_1$, are sputter-deposited in lower gas pressure atmospheres (4.2 and 1.4 mTorr, respectively), and the second Ru interlayer, i.e., Ru$_2$, is sputter-deposited in a higher gas pressure atmosphere (30 mTorr), exhibit the highest values of $H_c$, $-H_n$ and $S_q$. By contrast, media with the single seed/interlayer of Ru (deposited with the same oxygen content recording layer as the media with the Ta/Ru$_1$/Ru$_2$ seed/interlayer structure) exhibited the lowest values of $H_c$, $-H_n$, and $S_q$.

TABLE III

| Seed/ interlayer structure | Ta Thickness (nm) | Ta Gas Pressure (mTorr) | Ru$_1$ Thickness (nm) | Ru$_1$ Gas Pressure (mTorr) | Ru$_2$ or Ru Thickness (nm) | Ru$_2$ or Ru Gas Pressure (mTorr) |
|---|---|---|---|---|---|---|
| Ta/Ru$_1$/Ru$_2$ | 3.2 | 4.2 | 16.1 | 1.4 | 10.7 | 30 |
| Ru$_1$/Ru$_2$ | | | 16.1 | 1.4 | 10.7 | 30 |
| Ru | | | | | 30 | 8.8 |

Referring now to Table IV, provided therein is a comparison of the magnetic and recording performance, and crystallographic orientations of perpendicular magnetic recording media with 160 nm thick FeCoB soft magnetic underlayers, 7 nm thick CoPtO$_x$ recording layers, and various seed/interlayer structures each of 20 nm total thickness, sputter-deposited in an Intevac 250 B+sputter system. As is evident from Table IV, media wherein the first Ru interlayer, i.e., Ru$_1$, is sputter-deposited in lower gas pressure atmospheres (1.4 mTorr), and the second Ru interlayer, i.e., Ru$_2$, is sputter-deposited in higher gas pressure atmospheres (30 mTorr) exhibited higher values of $H_c$, $-H_n$, $S_q$, and SMNR (i.e., signal-to-medium noise ratio, measured under 500 Kfci with a combination of a single pole write head and a GMR reader), and narrower FWHM of Ru/Co (0002) XRD rocking curve peaks than similar media comprised of a single Ru interlayer. Media which included the Ta seed layer in addition to the Ru$_1$/Ru$_2$ interlayer structure exhibited even better magnetic and recording performance, and narrower FWHM.

TABLE IV

| Seed/ inter- layers | Ta thickness (nm) | Ru$_1$ thickness (nm) | Ru$_2$ thickness (nm) | Ru$_1$ pressure (mTorr) | Ru$_2$ pressure (mTorr) | $H_c$ (Oe) | $-H_n$ (Oe) | $S_q$ | SMNR (dB) | FWHM (degrees) |
|---|---|---|---|---|---|---|---|---|---|---|
| Ru | 0 | 0 | 20 | | 15 | 4072 | −566 | .779 | 7.2 | 6.49 |
| Ru$_1$/Ru$_2$ | 0 | 10 | 10 | 1.4 | 15 | 5561 | 527 | .914 | 10.8 | 4.62 |
| Ta/ Ru$_1$/Ru$_2$ | 1.3 | 10 | 8.7 | 1.4 | 15 | 5999 | 1087 | .978 | 13.1 | 4.06 |

TABLE IV-continued

| Seed/ interlayers | Ta thickness (nm) | $Ru_1$ thickness (nm) | $Ru_2$ thickness (nm) | $Ru_1$ pressure (mTorr) | $Ru_2$ pressure (mTorr) | $H_c$ (Oe) | $-H_n$ (Oe) | $S_q$ | SMNR (dB) | FWHM (degrees) |
|---|---|---|---|---|---|---|---|---|---|---|
| Ta/ $Ru_1/Ru_2$ | 1.3 | 5 | 13.7 | 1.4 | 15 | 5660 | 1269 | .982 | 12.2 | 4.21 |

It has also been determined that $Ru_1/Ru_2$ interlayer structures deposited on Ag seed layers significantly improve the magnetic and crystallographic properties of perpendicular magnetic recording media. Table V below provides a comparison of perpendicular media with and without Ru-containing interlayers sputter-deposited in a low gas pressure atmosphere (1.4 mTorr). Media with 160 nm thick soft magnetic underlayers and 7 nm thick $CoPtO_x$ recording layers were fabricated with two different types of 20 nm thick seed/interlayers, i.e., Ag/Ru and $Ag/Ru_1/Ru_2$. As is evident from the data in Table V, media with the $Ag/Ru_1/Ru_2$ seed/interlayer structure wherein the first Ru interlayer, $Ru_1$, was sputter-deposited in a lower gas pressure atmosphere (1.4 mTorr) and the second Ru interlayer, $Ru_2$, was sputter-deposited in a higher gas pressure atmosphere (15 mTorr), exhibited higher values of $H_c$, $—H_n$, $S_q$, and narrower FWHM than similar media with a single Ru layer sputter-deposited on a Ag seed layer in a higher gas pressure atmosphere (15 mTorr).

TABLE V

| Seed/ interlayers | Ag Thickness (nm) | $Ru_1$ Thickness (nm) | $Ru_2$ or Ru thickness (nm) | $Ru_1$ pressure (mTorr) | $Ru_2$ or Ru pressure (mTorr) | $H_c$ (Oe) | $-H_n$ (Oe) | $S_q$ | FWHM degrees |
|---|---|---|---|---|---|---|---|---|---|
| Ag/Ru | 2.6 | N/A | 17.4 | N/A | 15 | 4535 | −51 | .881 | 4.86 |
| $Ag/Ru_1/Ru_2$ | 2.6 | 10 | 7.4 | 1.4 | 15 | 5997 | 1077 | .993 | 2.61 |

In each of the illustrated examples of perpendicular magnetic recording media fabricated according to the principles/methodologies of the present invention, an adhesion enhancement layer, e.g., a 3.5 nm thick Ti layer, can be deposited between the substrate surface and the soft magnetic underlayer(s). The latter may, for example, be formed of CoZrNb, FeCoB, etc., and comprised of a single layer or multi-layer structure, such as where thin (e.g., 2 nm) Ta spacer layers or thin anti-ferromagnetic coupling (AFC) layers are interposed between adjacent pairs of magnetically soft layers. Finally, a variety of substrate materials may be utilized, including, inter alia, metallic substrates including non-magnetic metals such as Al, Al-based alloys, NiP-plated Al, and non-metal substrates, e.g., glass, ceramics, glass-ceramics composites and laminates, etc.

Thus, the present invention advantageously provides improved, high areal density, magnetic alloy-based perpendicular magnetic data/information and storage retrieval media including improved seed layers, soft magnetic underlayers, and non-magnetic interlayer structures which provide advantageous out-of-plane growth orientation of the magnetic recording layer which afford improved media performance characteristics. The media of the present invention are especially useful when employed in conjunction with single-pole recording/retrieval transducer heads and enjoy particular utility in high recording density systems for computer-related applications. In addition, the inventive media can be fabricated by means of conventional media manufacturing technologies, e.g., sputtering.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A perpendicular magnetic recording medium, comprising:

(a) a non-magnetic substrate having a surface; and (b) a layer stack formed over said substrate surface, said layer stack comprising, in overlying sequence from said substrate surface:

(i) a magnetically soft underlayer;

(ii) an interlayer structure for crystallographically orienting a layer of a perpendicular magnetic recording material formed thereon; and (iii) at least one crystallographically oriented magnetically hard perpendicular recording layer;

wherein said interlayer structure comprises, in overlying sequence from a surface of said magnetically soft underlayer:

(1) a first crystalline interlayer of a non-magnetic material formed in a gas atmosphere at a first pressure; and (2) a second crystalline interlayer of a non-magnetic material formed in a gas atmosphere at a second pressure greater than said first pressure, each of said first and said second crystalline interlayers comprises a non-magnetic material selected from the group consisting of Ru, RuCr, other Ru-based alloys, CoCrRu, Ti, CoCr, CoCrPt, CoCrTa, and CoCrMo, and wherein said interlayer structure provides said magnetically hard perpendicular magnetic recording layer formed thereon with a hexagonal close-packed crystal lattice with a <0002> out-of-plane growth orientation.

2. The medium according to claim 1, wherein:
said magnetically soft underlayer comprises at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, FeCoTaZr, and a laminated structure comprised of a plurality of magnetic layers each comprised of at least one of the recited magnetic materials and spaced-apart by spacer layers each comprised of at least one material selected from the group consisting of Ta, C, and Si or antiferromagnetic coupling layers each comprised of at least one material selected from the group consisting of Ru and IrMn.

3. The medium according to claim 2, wherein:
said magnetically soft underlayer comprises FeCoB.

4. A perpendicular magnetic recording medium, comprising:
(a) a non-magnetic substrate having a surface; and
(b) a layer stack formed over said substrate surface, said layer stack comprising, in overlying sequence from said substrate surface:
(i) a magnetically soft underlayer;
(ii) an interlayer structure for crystallographically orienting a layer of a perpendicular magnetic recording material formed thereon; and
(iii) at least one crystallographically oriented magnetically hard perpendicular recording layer;
wherein said interlayer structure comprises, in overlying sequence from a surface of said magnetically soft underlayer:
(1) a first crystalline interlayer of a non-magnetic material formed in a gas atmosphere at a first pressure; and
(2) a second crystalline interlayer of a non-magnetic material formed in a gas atmosphere at a second pressure greater than said first pressure,
each of said first and said second crystalline interlayers comprises a non-magnetic material selected from the group consisting of Ru, RuCr, other Ru-based alloys, CoCrRu, Ti, CoCr, CoCrPt, CoCrTa, and CoCrMo, and
adjacent grains of the second crystalline interlayer are physically separated.

5. The medium according to claim 1, wherein:
adjacent grains of said at least one magnetically hard perpendicular recording layer are physically separated.

6. The medium according to claim 5, wherein:
said at least one magnetically hard perpendicular recording layer comprises at least one magnetic material selected from the group consisting of: (1) Co-based magnetic alloys including one or more elements selected from the group consisting of Cr, Fe, Ta, Ni, Mo, Pt, V, Nb, Ge, Si, Al, B, Ti, Zr, Hf, and Pd; (2) oxides of said Co-based magnetic alloys; (3) iron nitrides, and (4) iron oxides.

7. The medium according to claim 1, wherein said layer stack further comprises:
(iv) an amorphous or crystalline seed layer between said magnetically soft underlayer and said interlayer structure.

8. The medium according to claim 7, wherein:
said amorphous or crystalline seed layer comprises at least one material selected from the group consisting of: Ta, Au, Cu, Pd, TiCr, Pt, and Ag.

9. The medium according to claim 1, wherein said layer stack further comprises:
(v) an adhesion layer in overlying contact with said substrate surface.

10. The medium according to claim 9, wherein said adhesion layer comprises at least one material selected from the group consisting of: Cr, CrTi, Ti, and TiNb.

11. The medium according to claim 1, wherein said layer stack further comprises:
(vi) a protective overcoat layer on an outermost surface of said at least one magnetically hard perpendicular recording layer.

12. The medium according to claim 11, wherein said protective overcoat layer comprises a carbon (C)-containing material.

13. The medium according to claim 1, wherein said magnetically soft underlayer is sputter-deposited at a sufficiently large target-to-substrate spacing and a sufficiently low gas pressure selected to provide said underlayer with a smooth surface having a low average surface roughness Ra below about 0.3 nm, as measured by Atomic Force Microscopy (AFM).

14. The medium according to claim 1, wherein said first pressure is less than about 5 mTorr, and said second pressure is at least about 15 mTorr.

15. A method of manufacturing a perpendicular magnetic recording medium, comprising steps of:
(a) providing a non-magnetic substrate having a surface; and
(b) forming a layer stack over said substrate surface, said layer stack comprising, in overlying sequence from said substrate surface:
(i) a magnetically soft underlayer;
(ii) an interlayer structure for crystallographically orienting a layer of a perpendicular magnetic recording material formed thereon; and
(iii) at least one crystallographically oriented magnetically hard perpendicular recording layer;
wherein:
said interlayer structure comprises sputter forming, in overlying sequence from a surface of said magnetically soft underlayer:
(1) a first crystalline interlayer of a non-magnetic material sputter-deposited in a gas atmosphere at a first pressure; and
(2) a second crystalline interlayer of a non-magnetic material sputter-deposited in a gas atmosphere at a second pressure greater than said first pressure,
each of said first and said second crystalline interlayers comprises a non-magnetic material selected from the group consisting of Ru, RuCr, other Ru-based alloys, CoCrRu, Ti, CoCr, CoCrPt, CoCrTa, and CoCrMo, and
step (b) comprises forming said second crystalline interlayer such that adjacent grains thereof are physically separated.

16. The method as in claim 15, wherein step (b) further comprises forming an amorphous or crystalline seed layer between said magnetically soft underlayer and said interlayer structure.

17. The method as in claim 16, wherein said amorphous or crystalline seed layer comprises at least one material selected from the group consisting of: Ta, Au, Cu, Pd, TiCr, Pt, and Ag.

18. The method as in claim 15, wherein step (b) comprises forming said layer stack such that:
said magnetically soft underlayer comprises at least one magnetic material selected from the group consisting of: NiFe (Permalloy), NiFeNb, CoZr, CoZrTa, CoZrCr, CoZrNb, CoFe, Fe, FeN, FeSiAl, FeAlN, FeSiAlN, FeCoC, FeCoB, FeTaN, FeTaC, and FeCoTaZr, and a laminated structure comprised of a plurality of magnetic layers each comprised of at least one of the recited magnetic materials and spaced-apart by spacer layers each comprised of at least one material selected from the group consisting of Ta, C, and Si or anti-ferromagnetic coupling (AFC) layers each comprised of at least one material selected from the group consisting of Ru and IrMn;

said at least one magnetically hard perpendicular recording layer comprises at least one magnetic material selected from the group consisting of: (1) Co-based magnetic alloys including one or more elements selected from the group consisting of Cr, Fe, Ta, Ni, Mo, Pt, V, Nb, Ge, Si, Al, B, Ti, Zr, Hf, and Pd; (2) oxides of said Co-based magnetic alloys; (3) iron nitrides; (4) and iron oxides.

19. The method as in claim 15, wherein step (b) further comprises forming as part of said layer stack:
    (v) an adhesion layer in overlying contact with said substrate surface; and
    (vi) a protective overcoat layer on an outermost surface of said at least one magnetically hard perpendicular recording layer.

20. The method as in claim 15, wherein said magnetically soft underlayer is formed by sputter deposition at a sufficiently large target-to-substrate spacing and a sufficiently low gas pressure selected to provide said underlayer with a smooth surface having a low average surface roughness Ra below about 0.3 nm, as measured by Atomic Force Microscopy (AFM).

21. The method as in claim 15, wherein said first pressure is less than about 5 mTorr, and said second pressure is at least about 15 mTorr.

22. A method of manufacturing a perpendicular magnetic recording medium, comprising steps of:
    (a) providing a non-magnetic substrate having a surface; and
    (b) forming a layer stack over said substrate surface, said layer stack comprising, in overlying sequence from said substrate surface:
        (i) a magnetically soft underlayer;
        (ii) an interlayer structure for crystallographically orienting a layer of a perpendicular magnetic recording material formed thereon; and
        (iii) at least one crystallographically oriented magnetically hard perpendicular recording layer;
    wherein:
    said interlayer structure comprises sputter forming, in overlying sequence from a surface of said magnetically soft underlayer:
    (1) a first crystalline interlayer of a non-magnetic material sputter-deposited in a gas atmosphere at a first pressure; and
    (2) a second crystalline interlayer of a non-magnetic material sputter-deposited in a gas atmosphere at a second pressure greater than said first pressure,
    each of said first and said second crystalline interlayers comprises a non-magnetic material selected from the group consisting of Ru, RuCr, other Ru-based alloys, CoCrRu, Ti, CoCr, CoCrPt, CoCrTa, and CoCrMo, and wherein said interlayer structure provides said magnetically hard perpendicular magnetic recording layer formed thereon with a hexagonal close-packed crystal lattice with a <0002> out-of-plane growth orientation.

23. The perpendicular magnetic recording medium according to claim 4, wherein said magnetically soft underlayer is sputter deposited at a sufficiently large target-to-substrate spacing and a sufficiently low gas pressure selected to provide said underlayer with a smooth surface having a low average surface roughness Ra below about 0.3 nm, as measured by Atomic Force Microscopy (AFM).

* * * * *